July 19, 1938.  W. B. FAGEOL  2,123,991
COOLING APPARATUS FOR AUTOMOTIVE VEHICLES
Filed Jan. 14, 1936
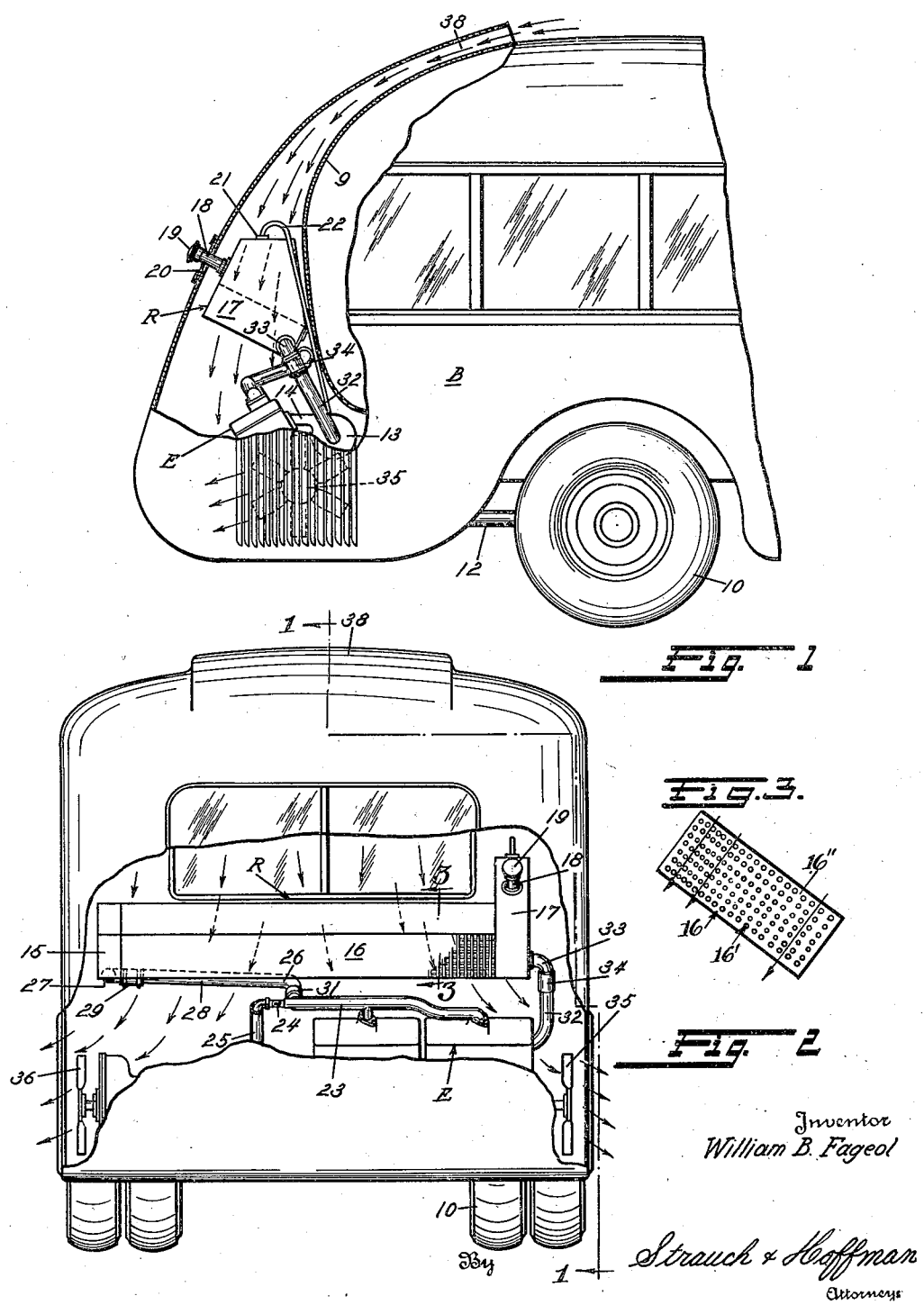
Inventor
William B. Fageol
By Strauch & Hoffman
Attorneys Patented July 19, 1938

2,123,991

UNITED STATES PATENT OFFICE 2,123,991

COOLING APPARATUS FOR AUTOMOTIVE VEHICLES

William B. Fageol, Kent, Ohio, assignor to Twin Coach Company, Kent, Ohio, a corporation of Ohio Application January 14, 1936, Serial No. 59,143

3 Claims. (Cl. 123—174)

The present invention relates to automotive vehicles, and it is more particularly concerned with cooling apparatus for the engines of such vehicles, although it is not limited to such use.

Rear-motored vehicles have been rather widely adopted in the bus field, and it has been found that by reason of the location of the motor special problems have arisen in cooling the motors of rear-motored vehicles, which are of the internal combustion type.

It is a primary object of this invention to provide a cooling apparatus for rear motored vehicles which efficiently cools the engine and is rugged and fool proof.

It is a further major object of my invention to devise a cooling apparatus for rear motored vehicles which will insure a constant supply of cooling water to the cylinders and which will not tend to overflow when the engine is suddenly accelerated.

My invention also aims to provide rear motored vehicles with a cooling system that will efficiently cool the engine, provide for considerable expansion of the cooling fluid without loss thereof, and insure positive flow of the cooling fluid through all parts of the radiator core.

Further objects of the invention will become apparent as the specification proceeds in connection with the annexed drawing, and from the appended claims.

In the drawing:

Figure 1 is a side elevational view of a rear motored bus equipped with the cooling apparatus of my invention, and parts have been broken away substantially along line 1—1 of Fig. 2 in order to more clearly show the structure involved.

Figure 2 is a rear view of the bus of Figure 1, and the body has been broken away in order to show the engine and cooling apparatus.

Figure 3 is a section taken along line 3—3 of Figure 2 illustrating the radiator core construction.

With continued reference to the drawing, wherein like reference characters are employed to designate like parts throughout the several views thereof, the bus B illustrated is of a character that has gone into comparatively wide use, and only the rear of it is shown as the bus per se forms no part of the present invention. The bus body is divided into a rear engine compartment and a passenger compartment by a partition 9. Partition 9 and the rear of the body are preferably provided with aligned windows. The bus is equipped with rear wheels 10 which are driven by an engine E through a change speed transmission (not shown) and a propeller shaft and universal joint assembly 12.

Internal combustion engine E is of the conventional water jacketed type and drives a pump 13 which is utilized to circulate the water through the cooling system. Pump 13 has its outlet 14 connected to the water jacket of engine E and is adapted to force the water therethrough in conventional manner.

Mounted above engine E in any suitable manner is a radiator R which is made up of an inlet header or tank section 15, a core section 16 and an outlet header or second tank section 17. Tank section 15 functions as a manifold for feeding the water into various passages in the radiator core, and tank 17 functions as an outlet manifold and expansion tank. Tank 17 extends upwardly as is shown and is provided with a filler neck 18 having a filler cap 19.

Filler neck 18 extends through an opening in the bus body and is provided with a gasket 20 for preventing leakage of water and dust into the bus. A tight joint is accordingly provided and yet the parts may move relatively in response to weave of the vehicle without destroying efficiency of the joint. Tank 17 is also provided with a fitting 21 to which an overflow pipe 22 is connected. Pipe 22 extends downwardly in the vehicle and is designed to carry away any overflow from the system to the street.

The cylinder water jackets of engine E are interconnected by a manifold 23 having a stop cock 24, a hot water heater connection 25, and a radiator connection 26. Stop cock 24 may be operated to allow water to flow into the hot water heating system of the bus (not shown). Manifold 23 is connected to header 15 by means of a fitting 27, a conduit 28 and flexible hose sections 29 and 31. Outlet header 17 of radiator R is connected to the intake side of pump 13 by means of a pipe 32, a fitting 33 and a hose section 34.

It is therefore apparent that pump 13 is operable to force water or other cooling fluid through the engine blocks, thence through header 15 of the radiator by way of manifold 23 and pipe 28. Fluid is forced from left to right (Figure 2) through the core of the radiator and into outlet header 17. One type of core section 16 which may be used in my invention and which is shown in Figures 2 and 3 includes a plurality of longitudinally extending water circulating tubes 16' supported by conventional perforated plates 16". Each tube 16' extends between and opens into opposite headers 15 and 17. Air is drawn through the upper grid walls and passes substantially vertically downward through passages between the tubes and plates, as shown by the arrows. It will be understood that my invention is not restricted to the use of the illustrated form of radiator core. A honeycomb or any other form of core may be used, the only requisite being that the cooling fluid is forced substantially normally to the path of the air sucked in the scoop and passed through the radiator. It should be observed that the fluid is thus positively forced horizontally through all portions of the radiator core. The cooling fluid then flows from tank 17 to the intake side of the pump by way of pipe 32. As inlet header 15 is closed there is no possibility of surges in the system forcing the cooling fluid out of the system at this point.

The cooling fluid is accordingly forced through radiator R under pressure and there is no tendency for the fluid to be splashed out of the system because the fluid in emerging from radiator core 16 is in a semi-quiescent state and header 17 is closed except for the overflow pipe 22, which is rather remote from the fluid emerging from the radiator core. The comparatively large space provided by tank 17 allows adequate room for expansion of fluid in the cooling system in response to temperature changes and pipe 22 allows steam to escape from the system, if for any reason it should develop therein. The radiator cooling system may be readily filled and replenished by removing filler cap 19.

Cooling air is preferably drawn through the radiator by means of a pair of fans 35 and 36. Fan 35 is driven from the front end of the engine in conventional manner whereas fan 36 is driven at engine speed from an extension of the crank shaft located in the transmission. Air is admitted to the engine compartment by way of a scoop 38 mounted on the roof of the bus and the air currents take the paths indicated by the arrows in Figures 1 and 2. The lower sides of the vehicle body are provided with louvers for permitting the air to be freely exhausted from the engine compartment.

Although I have shown and described my invention as being applied to a rear-motored bus, it is to be understood that it may be applied to any other desired vehicle or in fact to stationary power plants without departing from the spirit of my invention. The terms "water" and "fluid" as employed in the appended claims, are intended to embrace my invention irrespective of whether water or water mixed with anti-freeze substances are used in the cooling system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an internal combustion engine, a pump driven by said engine, a conduit placing the water jacket of said engine in communication with the outlet side of said pump thereby enabling the latter to force a cooling fluid through said water jacket, an elongated radiator disposed substantially horizontally and mounted adjacent said engine, said radiator comprising a core portion located intermediate its ends with passages through which air passes substantially vertically downwardly, a closed inlet header at one end thereof and an outlet header at the other end thereof, said outlet header being elongated vertically to provide an expansion space, a conduit placing the lower portion of said outlet header in communication with the intake side of said pump and a conduit placing said engine water jacket in fluid communication with the inlet header of said radiator whereby cooling fluid is positively forced horizontally through the core portion of said radiator from said inlet header toward said outlet header.

2. In a vehicle having an internal combustion engine located in a transversely and vertically elongated compartment in the rear portion thereof and drivingly connected with the vehicle wheels, means driven by said engine and operable to force a cooling fluid through the water jacket thereof, an elongated radiator disposed in said compartment above said engine in substantially a horizontal plane, said radiator comprising a central portion and a portion at each end thereof, one of said end portions being elongated vertically to provide an expansion space and being open to the atmosphere at its upper end, a conduit placing the lower portion of said last-mentioned end portion in fluid communication with the intake side of said pump, a conduit placing said engine water jacket in fluid communication with the other end portion of said radiator, and means associated with said vehicle and said compartment for causing a draft of air downwardly through said compartment and the central portion of said radiator and over said engine.

3. In a vehicle having a relatively narrow horizontally and vertically elongated compartment and a cooling apparatus for an internal combustion engine which is disposed in said compartment, a radiator of comparatively flat elongated form, said radiator being supported in said compartment with its major axis disposed substantially horizontally and with its minor axis disposed at an angle to the horizontal, said radiator having a centrally located core portion, an inlet header at one end and an outlet header at the other end, said radiator being arranged to have cooling fluid enter said inlet header, traverse said core horizontally and enter said outlet header, said inlet header being closed to the atmosphere and said outlet header being elongated vertically to provide a relatively large expansion space and having communication with the atmosphere at its upper end, and having a water outlet at its lower portion adapted for connection to the intake side of a circulating pump.

WILLIAM B. FAGEOL.